United States Patent
Jeng et al.

(10) Patent No.: US 10,967,563 B2
(45) Date of Patent: Apr. 6, 2021

(54) METHOD FOR REDUCING DRAWING FORCE IN FORMING PROCESS OF PHOTOCURABLE MATERIAL

(71) Applicant: National Taiwan University of Science and Technology, Taipei (TW)

(72) Inventors: Jeng-Ywan Jeng, Taipei (TW); Yih-Lin Cheng, Taipei (TW); Ding-Shyan Chen, Taipei (TW); Zhen-You Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 168 days.

(21) Appl. No.: 16/202,064

(22) Filed: Nov. 27, 2018

(65) Prior Publication Data
US 2020/0032033 A1   Jan. 30, 2020

(30) Foreign Application Priority Data

Jul. 26, 2018   (TW) .................... 107125948

(51) Int. Cl.
*B29C 64/124*   (2017.01)
(52) U.S. Cl.
CPC ...... *B29C 64/124* (2017.08); *C08K 2201/012* (2013.01)
(58) Field of Classification Search
CPC .................................................. B29C 64/124
See application file for complete search history.

(56) References Cited

U.S. PATENT DOCUMENTS

| | | | |
|---|---|---|---|
| 2016/0288376 A1* | 10/2016 | Sun | C08K 5/005 |
| 2016/0368210 A1* | 12/2016 | Chen | B29C 64/106 |
| 2018/0000570 A1* | 1/2018 | Sun | A61C 13/0004 |

OTHER PUBLICATIONS

Mohajeri et al., "Theoretical investigation on antioxidant activity of vitamins and phenolic acids for designing a novel antioxidant", 2009, Journal of Molecular Structure, 930.1-3, pp. 15-20. (Year: 2009).*
B9Creations, "B9 Instructional Vat Recoat", 2015, YouTube, https://www.youtube.com/watch?v=VO8NkNtoVoo, all YouTube video (Year: 2015).*

* cited by examiner

*Primary Examiner* — Joseph S Del Sole
*Assistant Examiner* — Jerzi H Moreno Hernandez

(57) ABSTRACT

The present invention provides a method for reducing a drawing force in a forming process of a photocurable material by adding a radical scavenger capable of terminating free radical polymerization into a substrate for carrying the photocurable material. The method comprises: providing a mold release composition at least comprising a radical scavenger and a molding agent; and forming a mold release film from the mold release composition by curing forming or by combining with an upper surface of a plate, thereby preparing the substrate. In this way, during the light curing reaction of the photocurable material by irradiation with a light source, the radical scavenger in the upper surface of the substrate contacting with the photocurable material can react with free radicals in the photocurable material, such that the photocurable material forms an uncured layer for which light curing does not occur on the upper surface of the substrate.

6 Claims, 15 Drawing Sheets

METHOD FOR REDUCING DRAWING FORCE IN FORMING PROCESS OF PHOTOCURABLE MATERIAL

CROSS-REFERENCE TO PRIOR APPLICATION

The present application claims the benefit of Taiwanese patent application No. 107125948 filed on Jul. 26, 2018, the contents of which are hereby incorporated by reference.

BACKGROUND OF THE INVENTION

1. Technical Field

The present invention relates to a method for reducing a drawing force in a forming process of a photocurable material, and more particularly, to a method for forming an uncured layer for which light curing does not occur between a photocurable material and a substrate by using the principle of inhibiting free radical polymerization.

2. Description of the Related Art

Recently, the 3D printing technology has gotten more and more attention. However, in the stereolithography technology, often damage to a printing object may occur in the printing process due to generation of a vacuum adsorption force when a cured object is separated from the bottom of a resin tank, and the printing speed is also limited. In order to address the problem of a resin bonding force, at present, most companies use a highly hydrophobic material such as Teflon or PDMS as a coating layer or cladding layer at the bottom of a resin tank. Although the problem of the resin bonding force can be effectively addressed, the problem of the vacuum adsorption force still cannot be addressed. Therefore, many manufacturers and scholars have conducted research on various methods for addressing the vacuum adsorption force, including lateral translation of the resin tank and others, and common means among officially commercialized products are Hinged Peel Process and Sliding Peel Process with wiper, which are similar to the technology in which one side of the resin tank is stationary and the other side is movable. One more special patented technology is the Slide and Separate™ technology published by Asiga, which separates a cured resin from a bottom plate through use of a flexible resin tank bottom in combination with a scraper.

In order to improve the problem of a too strong bonding force of a hardened thin layer to a resin tank caused by bottom-exposure stereolithography, processing parameters such as different thicknesses of silicone film, hydrophobic coating, Z-axis rise speed are used to reduce an adhesive force therebetween, and a separating force is measured by a LoadCell. The use of silicone is mainly due to low coefficient of elasticity of a silicone film, and thus, deformation is easily generated in the separation, resulting in back diffusion of the resin and reduction of the adhesive force.

However, a major breakthrough in the research on the separating force is made until 2015. Carbon 3D company published the Continuous Liquid Interface Production (CLIP) technology. In the CLIP technology, with a breathable film as the bottom of a resin tank, through the phenomenon in which the reaction of free radicals with oxygen is faster than the reaction of free radicals with a liquid resin, oxygen is input at the bottom into the liquid resin, and the oxygen input rate is controlled to determine the thickness of a dead zone where the liquid resin does not suffer from polymerization, such that a layer of the resin can be kept in a liquid state above the resin tank, thereby eliminating the phenomenon of local vacuum. Such a technology is quite surprising, but still there are some drawbacks. Particularly, this technology was patented at the beginning of 2015 and was published on TED, and now, is not used in mass production but by lease. Possible reasons are as follows:

1. A large-area breathable film having a uniform pore distribution is not easy to manufacture—the non-uniformity may lead to inconsistency in the rate of inhibition reaction, thereby affecting forming quality.

2. The reaction rate is inconsistent—a photoinitiator can generate free radicals only after absorbing light rays and will not if no light rays are absorbed, but cannot selectively input oxygen according to different graphics, and therefore, different graphics may correspond to different thickness distributions of a dead zone, and can be printed only after detailed calculation and review.

3. The apparatus is too complicated and large—oxygen must be continuously input during the printing and it is necessary to provide a pump or cylinder. The pump suffers from the vibration problem and needs to be separately placed; and when a cylinder is used, care must be taken to ensure the pressure in the cylinder, or a large cylinder is purchased. These factors result in that the CLIP technology cannot be fully used in the photopolymerization curing technology.

SUMMARY OF THE INVENTION

In view of this, an objective of the present invention is to provide a method for reducing a drawing force in a forming process of a photocurable material, which is suitable for a free radical-type photocurable material. By adding a radical scavenger capable of inhibiting polymerization of free radicals into a substrate contacting with a photocurable material, when the photocurable material generates free radicals due to exposure, an uncured layer for which light curing does not occur can be formed between the substrate and the photocurable material, so as to achieve the effect of a separation force of zero, thereby overcoming the limitation in printing speed of the current stereolithography technology.

In other words, the present invention provides a method for reducing a drawing force in a forming process of a photocurable material, which is by adding a radical scavenger capable of terminating free radical polymerization into a substrate for carrying the photocurable material. The method comprises: providing a mold release composition at least comprising a radical scavenger and a molding agent; and forming a mold release film from the mold release composition by curing forming or by combining with an upper surface of a plate, thereby preparing the substrate. The radical scavenger is suitable for inhibiting carbon free radicals, or OH, RO, ROO, or other components containing oxygen free radicals released in the light curing process of the photocurable material; and for example, the radical scavenger may be at least one selected from the group consisting of vitamin antioxidants, phenolic antioxidants, phosphite antioxidants, sulfur antioxidants, C-centered radical scavengers, metal passivator, natural antioxidants, and fullerenes. The molding agent consists of silicon dioxide and/or a polymeric material that is light-transmittable after curing.

According to one embodiment of the present invention, during the light curing reaction of the photocurable material by irradiation with a light source, the radical scavenger in the upper surface of the substrate contacting with the photocurable material can react with free radicals in the photocurable material, such that the photocurable material forms an uncured layer for which light curing does not occur on the upper surface of the substrate.

According to one embodiment of the present invention, the mold release composition comprises 1 to 20 wt % of the radical scavenger and 80 to 99 wt % of the molding agent.

According to one embodiment of the present invention, the vitamin antioxidants consist of a water-soluble vitamin and/or a fat-soluble vitamin. The fat-soluble vitamin is at least one selected from the group consisting of vitamin A, vitamin D, vitamin E, and vitamin K, and the water-soluble vitamin is at least one selected from the group consisting of vitamin B1, vitamin B2, vitamin B3, vitamin B5, vitamin B6, vitamin B7, vitamin B9, vitamin B12, and vitamin C.

According to one embodiment of the present invention, the phenolic antioxidants are hindered phenol antioxidants, semi-hindered phenol antioxidants, polymeric hindered phenol antioxidants, or reactive hindered phenol antioxidants.

According to one embodiment of the present invention, the C-centered radical scavengers are hindered amines, benzofuranones, hydroxylamines, tertiary amine oxides, or bisphenol monoacrylates.

According to one embodiment of the present invention, the natural antioxidants are at least one polyphenol antioxidant selected from the group consisting of flavonoids, flavonol, flavone, catechin, flavanone, anthocyanin, soflavonoid, and extracts from natural plants; wherein the natural plants include at least one of Milk Thistle, Soybean, Wine grape, Acai berry, coffee berry, chamomile, pomegranate, ferns, and turmeric.

According to one embodiment of the present invention, the method further comprises adding a sustaining agent into the photocurable material, such that during the light curing reaction, the sustaining agent can reduce the radical scavenger that has reacted with free radicals in the photocurable material.

DETAILED DESCRIPTION OF THE PREFERRED EMBODIMENTS

Figure 1:
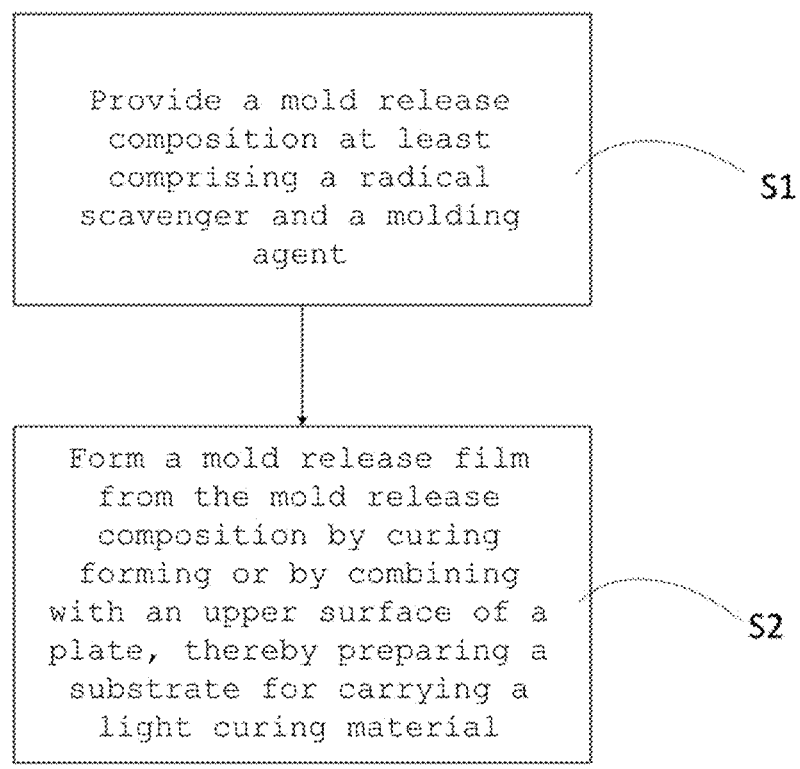
FIG. 1 shows a standard flow diagram of a method for reducing a drawing force in a forming process of a photocurable material of the present invention.

Hereafter, the embodiments of the present invention are described and illustrated in more details by providing different specific examples, in order to make the spirit and content of the present invention more complete and easy to understand. However, it should be appreciated by those ordinarily skilled in the art that the present invention of course is not limited to these examples, and the present invention can be achieved by using other identical or equivalent orders in functions and steps.

The above-mentioned and other technical contents, features, and effects of this invention will be clearly presented from the following detailed description of the embodiments in coordination with the reference drawings. Note that directional terms such as upper, lower, left, right, front or rear mentioned in the following examples are used to designate directions in the drawings to which reference is made. Thus, these directional terms are only used to illustrate, not limit the present invention, and the present invention can be achieved in any other manners.

The terms "drawing force" or "separating force" mentioned in the present invention means, after a photocurable material is carried by a substrate and is cured via illumination to form a 3D article, a force required to separate the 3D article from the substrate.

Please refer to FIG. 1, which shows a standard flow diagram of a method for reducing a drawing force in a forming process of a photocurable material of the present invention. The method comprises the following steps:

Step S1: providing a mold release composition at least comprising a radical scavenger and a molding agent; and Step S2: forming a mold release film from the mold release composition by curing forming or by combining with an upper surface of a plate, thereby preparing a substrate for carrying a photocurable material.

Figure 7A:
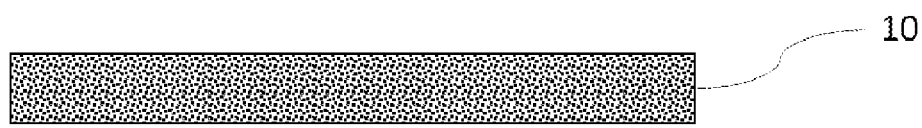
FIG. 7A shows a cross-section view of the substrate 10 in an embodiment of the present invention.

According to the creative idea of the present invention, the mold release composition at least comprises 1 to 20 wt % of the radical scavenger and 80 to 99 wt % of the molding agent. As shown in FIG. 7A, the mold release composition may form a substrate 10 for carrying a photocurable material via injection molding, extrusion, rotational molding, blow molding, thermoforming, or 3D printing, and the like, and the substrate 10 may be a film-shaped or 3D structure.

A photocurable material suitable for the present invention is generally a free-radical type photocurable material, that is, a polymer having an unsaturated double bond. For example, the photocurable material may comprise at least one or more than one of acrylic resins, acrylate resins, polyurethane acrylic resins, polyester acrylic resins, and polyether acrylic resins.

Figure 7B:
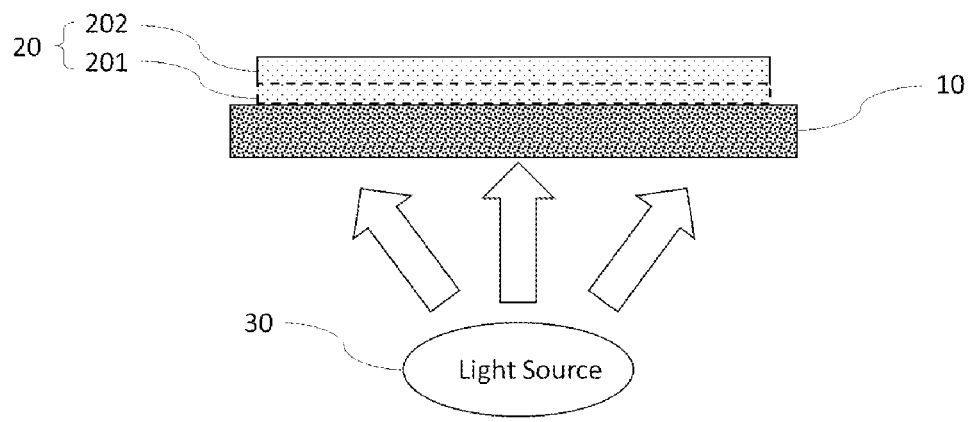
FIG. 7B shows a cross-section view of the substrate shown in FIG. 7A is used for the forming process.

According to the creative idea of the present invention, the radical scavenger is a substance that can completely terminate free radical polymerization of ethylenic monomers. The radical scavenger reacts with chain free radicals to form a non-free radical substance or a low active free radical, so as to terminate the polymerization. Please refer to FIG. 7B, which shows a cross-section view of the substrate shown in FIG. 7A is used for the forming process. When the photocurable material 20 is placed on the substrate 10, contacted with the substrate 10, and subjected to light curing reaction by a light source 30, the radical scavenger in the surface of the substrate 10 contacting with the photocurable material 20 can react with free radicals in the photocurable material 20, such that an uncured layer 201 is formed for which light curing reaction does not occur on the upper surface of the substrate, so as to avoid adhesion of a cured layer 202 formed by the cured photocurable material 20 to the surface of the substrate 10.

The amount of the radical scavenger in the mold release composition is generally between 1 wt % to 20 wt %, preferably between 1 wt % to 15 wt %, and most preferably between 1 wt % to 10 wt %. If the amount of the radical scavenger is less than the lower limit range above, the effect of inhibiting free radicals cannot be adequately obtained; and also, if more than the upper limit range above, the dispersion is difficult. In addition, the mold release composition may also be formulated with a dispersing agent, a dispersion stabilizing agent, a coupling agent, a hardening agent, a crosslinking agent, a polymerization initiator, a viscosity modifier, or a tackifier, and the like.

The radical scavenger is at least one selected from the group consisting of vitamin antioxidants, phenolic antioxidants, phosphite antioxidants, sulfur antioxidants, C-centered radical scavengers, metal passivator, and natural antioxidants.

The vitamin antioxidants consist of a water-soluble vitamin and/or a fat-soluble vitamin. The fat-soluble vitamin is at least one selected from the group consisting of vitamin A, vitamin D, vitamin E, and vitamin K, and the water-soluble vitamin is at least one selected from the group consisting of vitamin B1, vitamin B2, vitamin B3, vitamin B5, vitamin B6, vitamin B7, vitamin B9, vitamin B12, and vitamin C.

The phenolic antioxidants are hindered phenol antioxidants, semi-hindered phenol antioxidants, polymeric hindered phenol antioxidants, or reactive hindered phenol antioxidants; wherein the phenolic antioxidants may be any one of MEHQ, BHT, 10-TF, HQ, PBQ, HQMME, MTBHQ, and 2,5-DTBHQ.

The C-centered radical scavengers are hindered amines, benzofuranones, hydroxylamines, tertiary amine oxides, or bisphenol monoacrylates.

The natural antioxidants are at least one selected from the group consisting of flavonoids, flavonol, flavone, catechin, flavanone, anthocyanin, soflavonoid, and extracts from natural plants; wherein the natural plants include at least one of Milk Thistle, Soybean, Wine grape, Acai berry, coffee berry, chamomile, pomegranate, ferns, and turmeric.

According to the technical idea of the present invention, the radical scavenger may further comprise low molecular weight chromane derivatives or chromene derivatives having antioxidant properties.

Furthermore, according to the technical idea of the present invention, the molding agent is present in an amount of generally between 80 wt % to 99 wt %, preferably between 85 wt % to 99 wt %, and most preferably between 85 wt % to 99 wt %, and consists of silicon dioxide and/or a polymeric material that is light-transmittable after curing, preferably a polymeric material having a light transmittence of above 65% in common light rays. For example, the molding agent may consist of one or more of poly(methyl methacrylate), polystyrene, polycarbonate, polyethylene, polypropylene, polyvinyl chloride, and epoxy resins. Further, in addition to the silicon dioxide or polymeric material above, the molding agent may also be suitably added with a dispersing agent, a dispersion stabilizing agent, a coupling agent, a hardening agent, a crosslinking agent, a polymerization initiator, a viscosity modifier, or a tackifier, and the like.

Figure 8A:
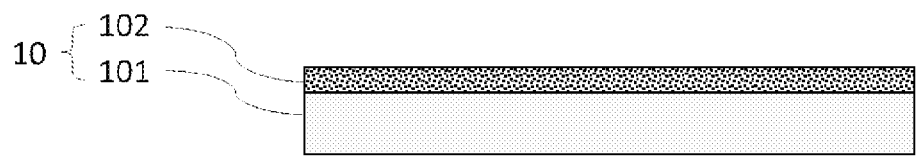
FIG. 8A shows a cross-section view of the substrate 10 in another embodiment of the present invention.
Figure 8B:
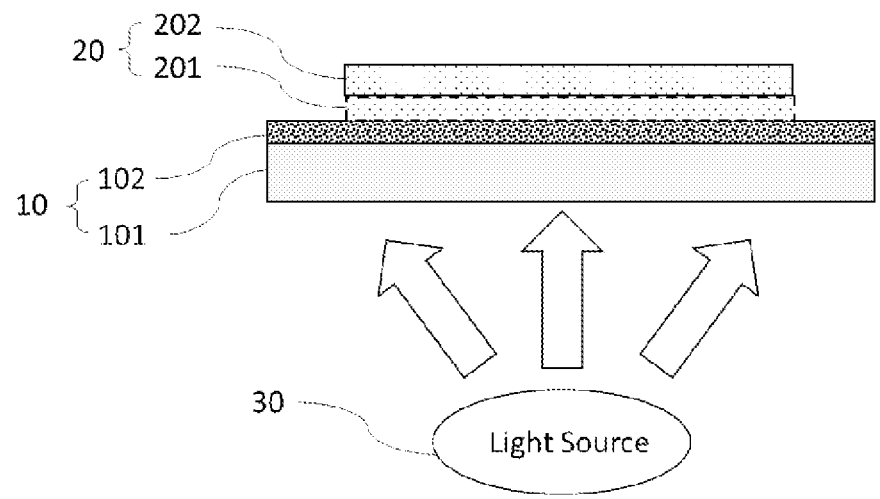
FIG. 8B shows a cross-section view of the substrate shown in FIG. 8A is used for the forming process.

In addition, please refer to FIG. 8A and FIG. 8B. FIG. 8A shows a cross-section view of the substrate 10 in another embodiment of the present invention, and FIG. 8B shows a cross-section view of the substrate 10 shown in FIG. 8A is used for the forming process. In this embodiment, a mold release film 102 may be constructed on the surface of an exiting plate 101 by using the mold release composition, so as to form a substrate 10 for carrying a photocurable material 20. The construction method includes coating the mold release composition onto the surface of the plate 101 and then drying at about 60 to 70° C. to form a mold release film 102. The coating may be performed by a general known method, for example, impregnation, dip coating, spin coating, blade coating, roll coating, bar coating, reverse-roll coating, brush coating, or spray coating.

According to the technical idea of the present invention, the mold release composition may further comprise a diluent, and may be added with a bonding agent for bonding with the substrate, if needed. The diluent may be an aromatic such as toluene, xylene, an alcoholic such as butanol, isopropanol, ethanol, a hydrocarbon such as hexane, cyclohexane, ethyl acetate, butyl acetate, methyl butylketone, or water. Also, the bonding agent may be any one of an organic bonding agent and an inorganic bonding agent. The organic bonding agent may be exemplified by acrylic resins, epoxy resins, polyester resins, vinyl acetate resins, polyvinyl alcohols, urea resins, phenol resins, fluororesins, polysilicone resins, organopolysiloxanes, polyurethane resins, UV curing resins, and electronic beam curing resins, and the like. Also, the inorganic bonding agent may be exemplified by silicon dioxide, sodium silicate, and paraffin wax, and the like.

According to the technical idea of the present invention, the method of the present invention can reduce a drawing force in a forming process of a photocurable material below 80%, preferably below 70%, and most preferably below 60%.

According to the technical idea of the present invention, the thickness of the mold release film is not particularly limited, but preferably is between 0.001 to 1000 μm to ensure light transmission.

Also, according to the technical idea of the present invention, the radical scavenger composition may form a mold release film via physical vapor deposition, chemical vapor deposition, plasma treatment, or surface modification.

Figure 9A:
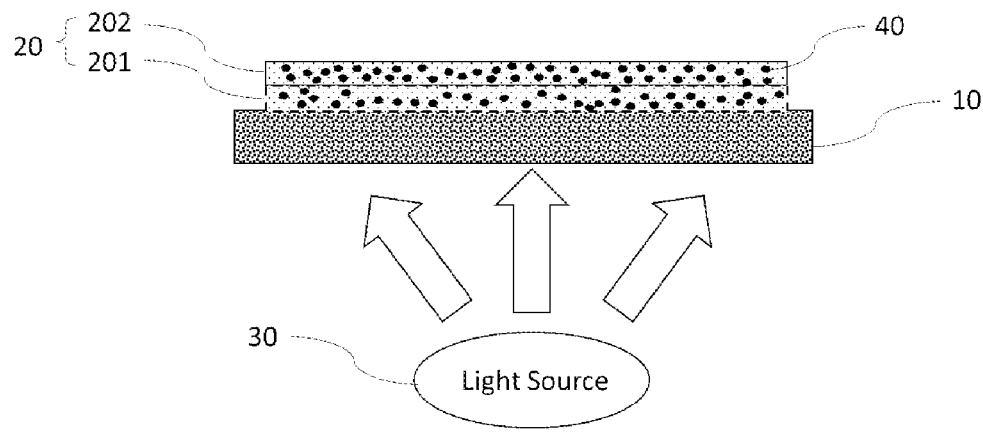
FIG. 9A and FIG. 9B respectively show other embodiments of the present invention.
Figure 9B:
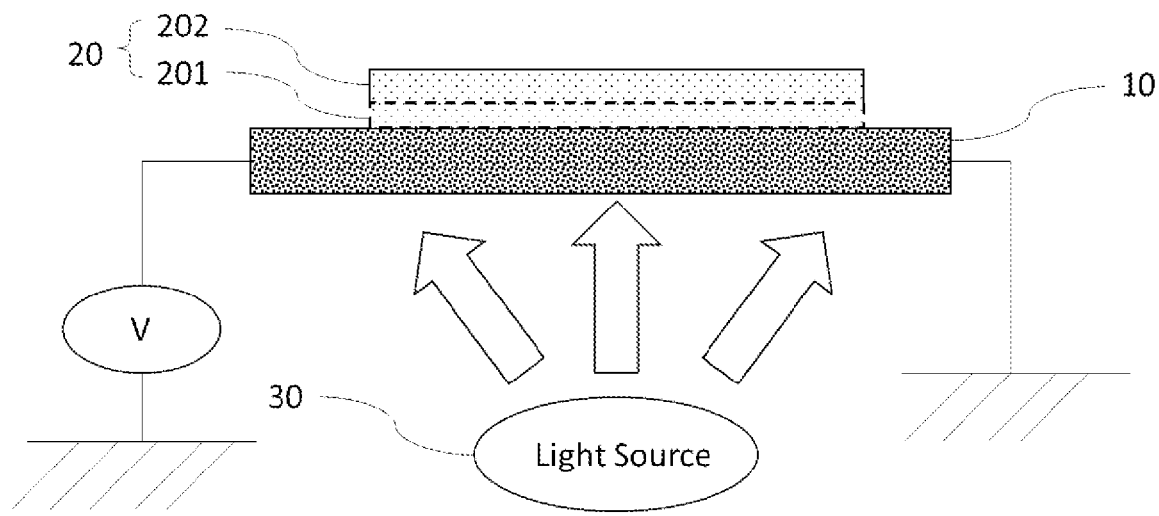

Further, please refer to FIGS. 9A and 9B, which respectively show other embodiments of the present invention. The embodiment shown in FIG. 9A is adding a sustaining agent 40 into the photocurable material 20, such that during the light curing reaction, the sustaining agent 40 can reduce the radical scavenger in the substrate 10 that has reacted with free radicals in the photocurable material 20. For example, when vitamin E is used as the radical scavenger, vitamin C may be added to the photocurable material 20 as a sustaining agent 40 to reduce free radicals of vitamin E. In addition, in the embodiment shown in FIG. 9B, a voltage V may be applied to the substrate 10, so as to reduce the radical scavenger that has reacted with free radicals in the photocurable material 20 by using the principle of electrochemical reaction. Thereby, the radical scavenger in the substrate 10 can continuously react with free radicals in the photocurable material 20 contacting with the substrate surface, so as to maintain the presence of an uncured layer 201.

Hereafter, the present invention is described in more details by means of comparative examples and examples respectively.

First, standard operation methods of the tests in comparative examples and examples of the present invention are described. Further, the photocurable material used in the following comparative examples and examples of the present invention is Phrozen LCD Resin (Hi-Res Black) provided by Phrozen company.

<Optimal Exposure Time Test>

In accordance with the optimal forming resolution, when a light curing reaction is performed on different materials of substrates using a particular exposure source and a particular photocurable material, a particular optimal exposure time is present.

Figure 2A:
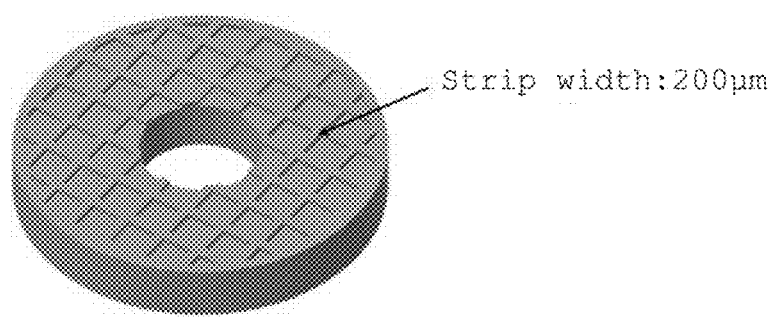
FIG. 2A and FIG. 2B respectively show a perspective view and a top view of a printed graphic used in a test with the optimal exposure time in the present invention.
Figure 2B:
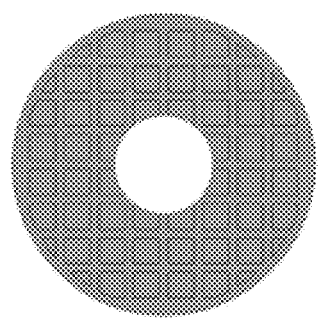

2 mL of a photocurable material is coated on a substrate and placed in a 3D printing machine, and 3D printing is performed at a light intensity of 40 mW/cm². A perspective view and a top view of a printed graphic used in the test are shown in FIG. 2A and FIG. 2B, respectively, and the exposure time is adjusted according to the substrate material. Then, the forming state of 3D fine structures formed at different exposure times is observed with a microscope, and recorded by photographing, so as to determine the optimal exposure time of the substrate.

<Separating Force Test>

2.0 mL of a photocurable material is dropped on a surface of a substrate with a pipette, and a light curing reaction is performed with the optimal exposure time of the substrate measured in the above optimal exposure time test and at a light intensity of 40 mW/cm². The illuminated photocurable material forms a hardened film on the substrate surface. Then, a separating force between the hardened film and the substrate surface is measured by a pressure sensor. In each separation, a micro voltage generated by a load cell in the pressure sensor may be converted into data, and recorded by a recorder as separating force data.

<Anti-Adhesion Effect Test>

2.0 mL of a photocurable material is dropped on a substrate with a pipette, and a light curing reaction is performed with an exposure time of 2 sec and at a light intensity of 50 mW/cm². The illuminated photocurable material forms a hardened film on the substrate surface. Then, the hardened film is removed from the substrate surface, and the thickness of the hardened film is measured. The thinner hardened film indicates the better anti-adhesion effect of the substrate.

Comparative Example 1

Figure 3A:
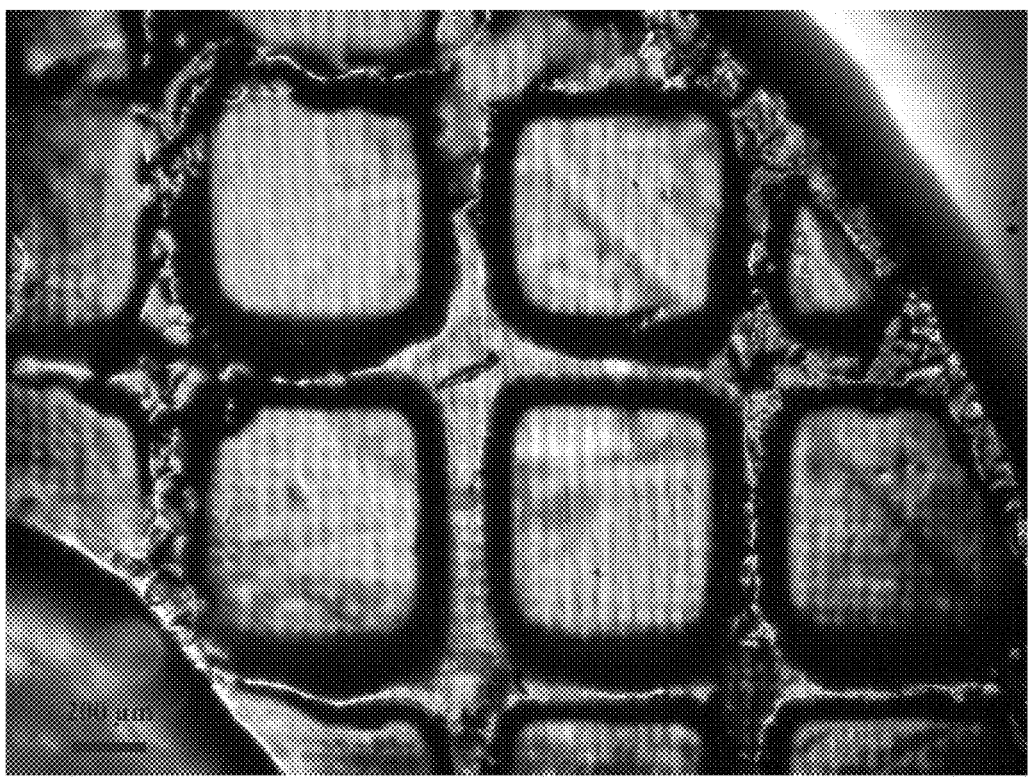
FIG. 3A to FIG. 3C sequentially show photographs of 3D fine structures formed at an exposure time of 2 s, 3 s and 4 s, for a test with the optimal exposure time in Comparative Example 1.
Figure 3B:
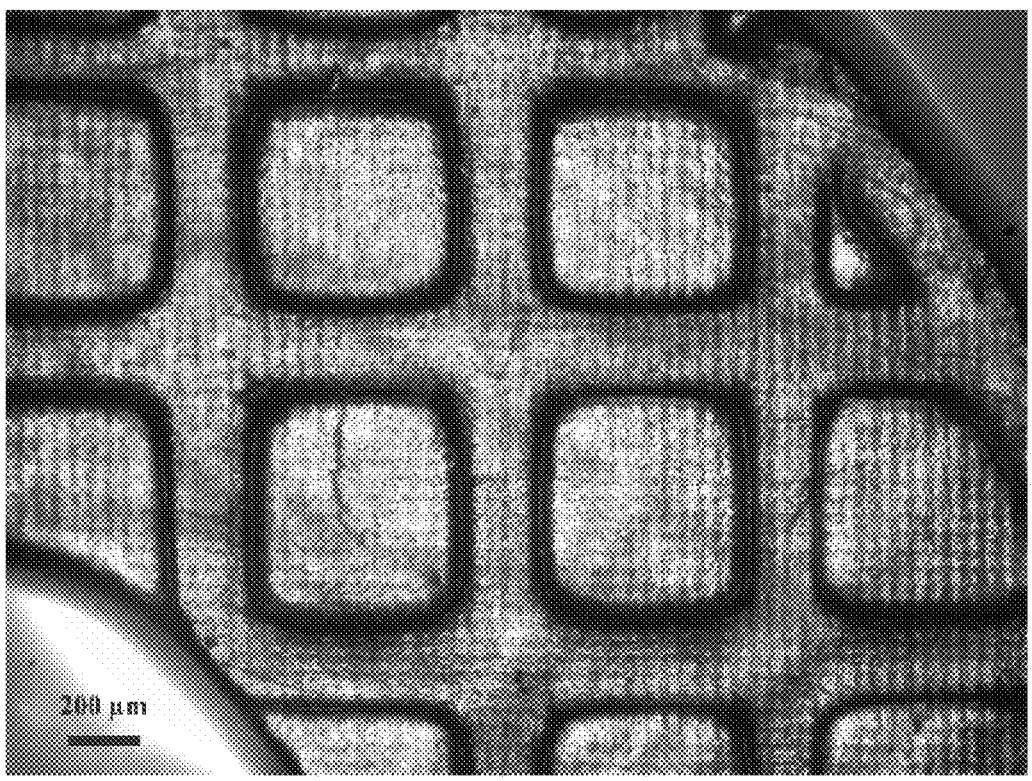
Figure 3C:
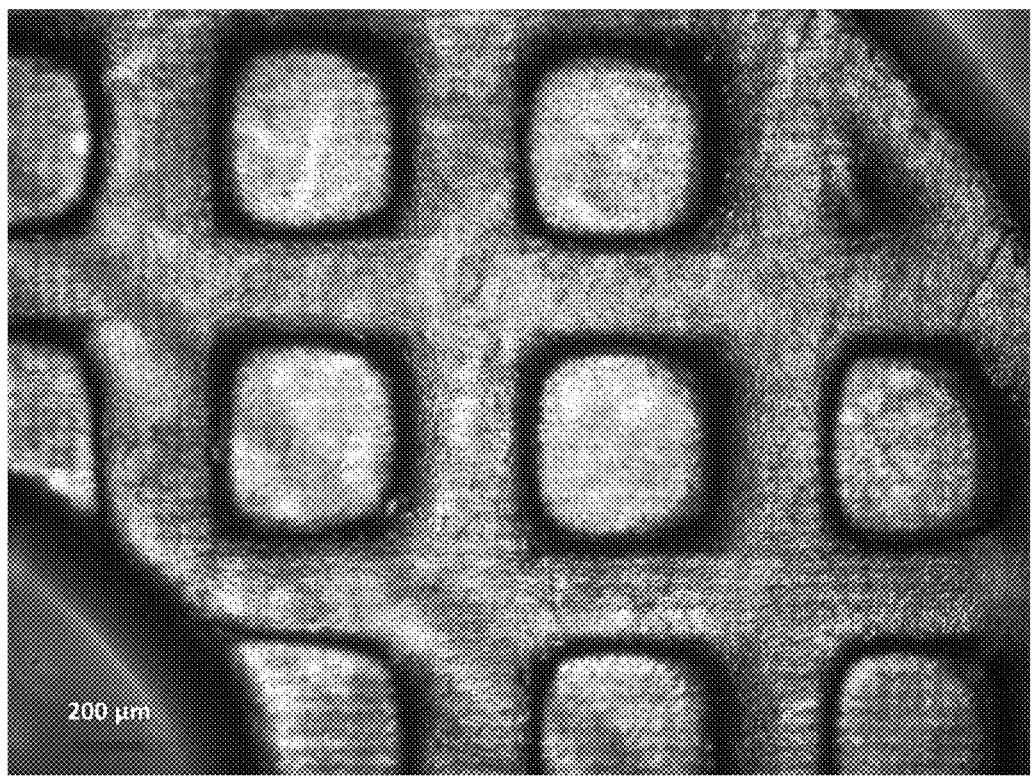

An untreated transparent silicone substrate (T1 hereinafter) was subjected to the optimal exposure time test at an exposure time of 2 sec, 3 sec, and 4 sec. The 3D fine structures formed at an exposure time of 2 sec, 3 sec, and 4 sec were sequentially shown in FIG. 3A to FIG. 3C, and observed with microscope, showing that the best forming effect is achieved at the exposure time of 3 sec. Therefore, the optimal exposure time of the substrate T1 is 3 sec.

Then, a separating force test was performed using the substrate T1 at the optimal exposure time of 3 sec for 8 times in total, and the resulting separating forces were 25.61 N, 30.52 N, 25.04 N, 23.16 N, 23.59 N, 21.31 N, 21.08 N, and 21.19 N respectively. An average separating force was calculated to be 23.36 N and the value was recorded in Table 1.

Also, the substrate T1 was subjected to the anti-adhesion effect test. The thickness of a hardened film obtained via a light curing reaction was measured to be 250 μm, and the value was recorded in Table 2.

Example 1

First, PDMS, PDMS hardening agent (a silane compound having multiple functional groups) and vitamin E were uniformly mixed in the dosages shown in Table 1 to obtain a mold release composition S1; and then, hexane as diluent was uniformly mixed with the mold release composition S1, where the weight ratio of hexane to the mold release composition is 1:2.

Also, the mold release composition S1 in a flow state was injected into a mold and heated at 60° C. for 24 h, such that the mold release composition S1 became a cured film, so as to obtain a substrate M1.

Figure 4A:
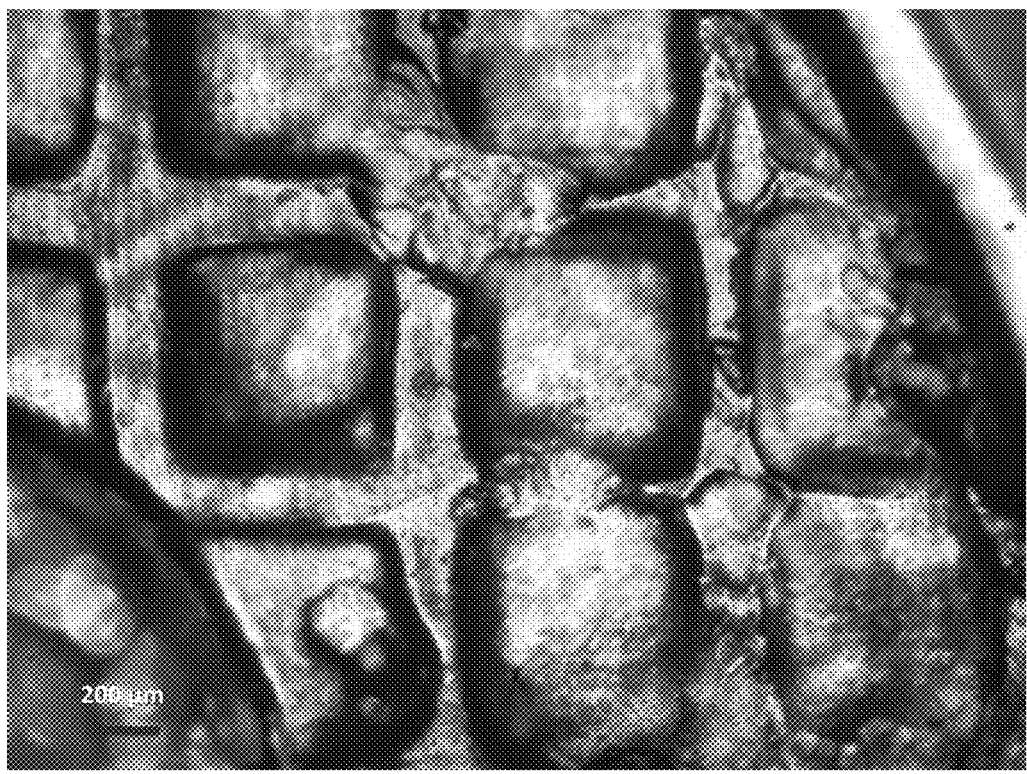
FIG. 4A to FIG. 4C sequentially show photographs of 3D fine structures formed at an exposure time of 3 s, 4 s and 5 s, for a test with the optimal exposure time in Example 1.
Figure 4B:
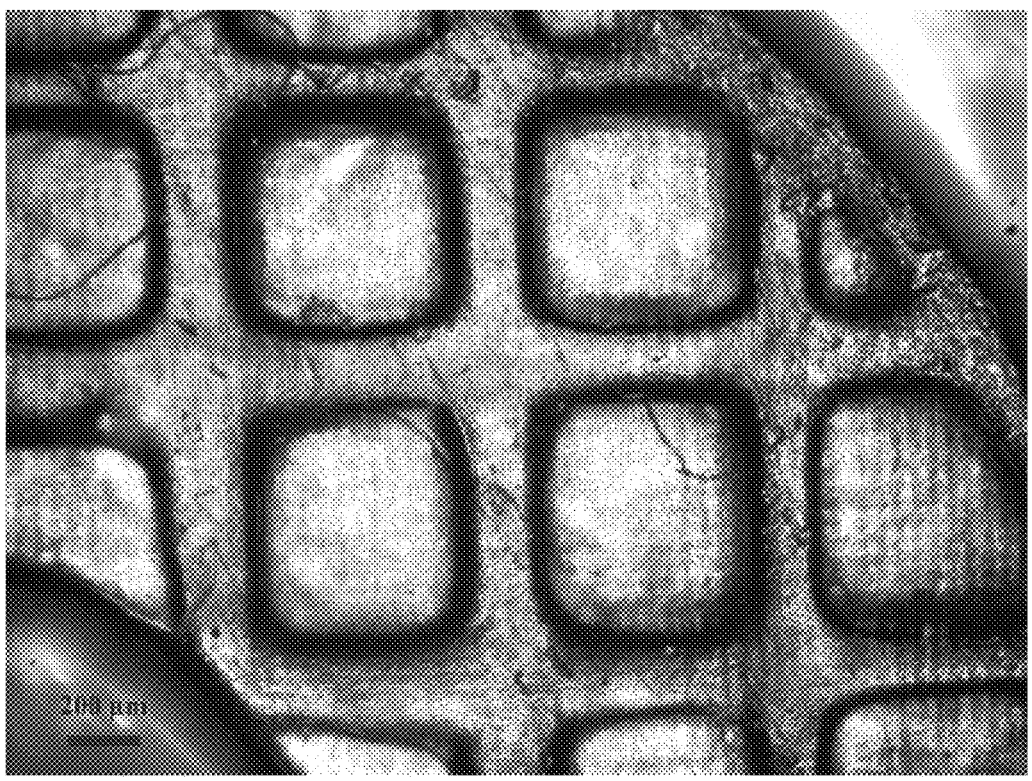
Figure 4C:
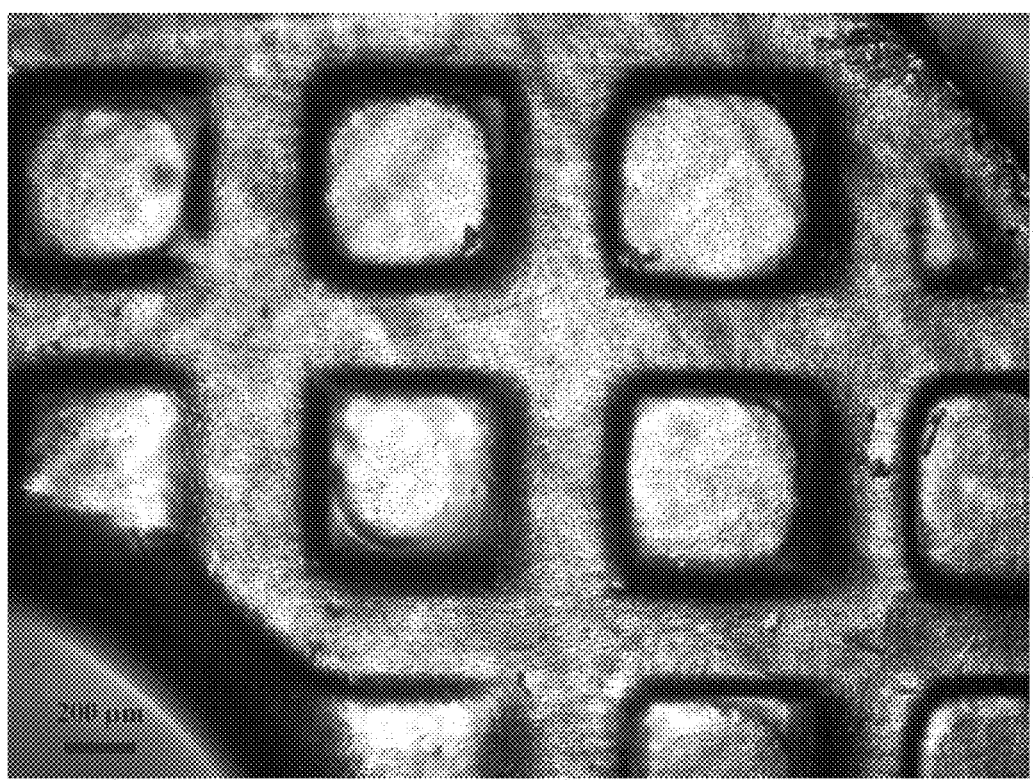

Then, the substrate M1 was subjected to the optimal exposure time test at an exposure time of 3 sec, 4 sec, and 5 sec. The 3D fine structures formed at an exposure time of 3 sec, 4 sec, and 5 sec were sequentially shown in FIG. 4A to FIG. 4C, and observed with microscope, showing that the best forming effect is achieved at the exposure time of 4 sec. Therefore, the optimal exposure time of the substrate M1 is 4 sec.

Then, a separating force test was performed using the substrate M1 at the optimal exposure time of 4 sec for 8 times in total, and the resulting separating forces were 8.74 N, 15.46 N, 11.52 N, 16.1 N, 13.83 N, 15.08 N, 14.98 N, and 12.34 N respectively. An average separating force was calculated to be 14.44 N and the value was recorded in Table 1.

Example 2

First, PDMS, PDMS hardening agent (a silane compound having multiple functional groups) and vitamin E were uniformly mixed in the dosages shown in Table 1 to obtain a mold release composition S2; and then, hexane as diluent was uniformly mixed with the mold release composition S2, where the weight ratio of hexane to the mold release composition is 1:2.

Also, the mold release composition S2 in a flow state was injected into a mold and heated at 60° C. for 24 h, such that the mold release composition S2 became a cured film, so as to obtain a substrate M2.

Figure 5A:
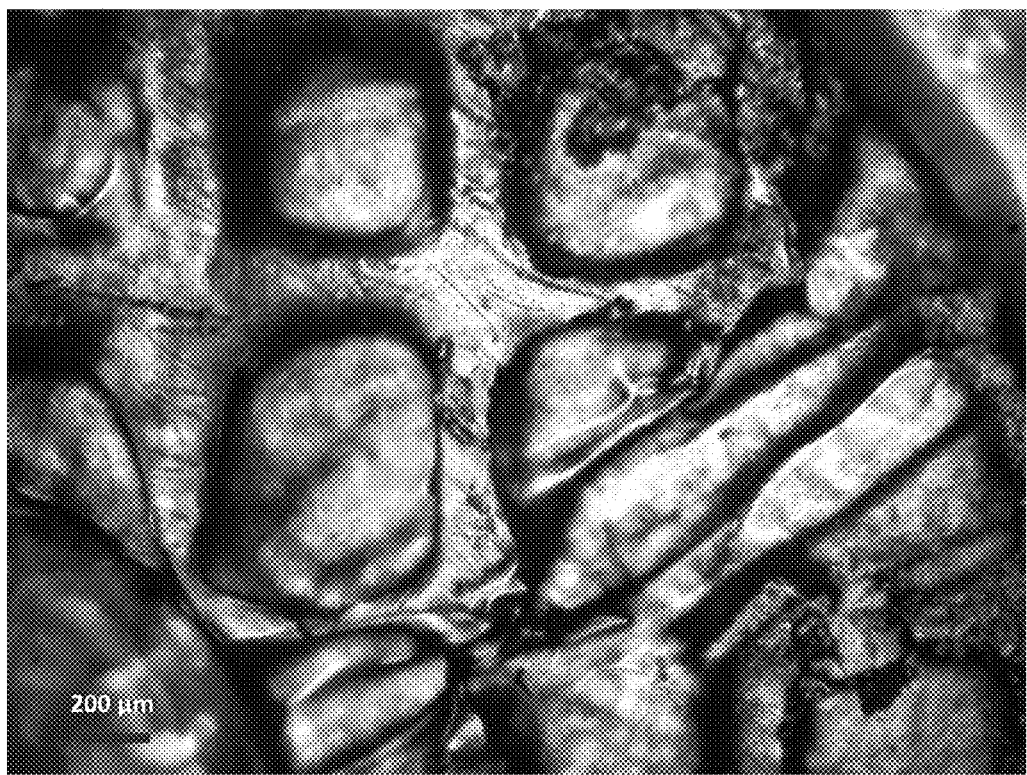
FIG. 5A to FIG. 5C sequentially show photographs of 3D fine structures formed at an exposure time of 5 s, 6 s and 7 s, for a test with the optimal exposure time in Example 2.
Figure 5B:
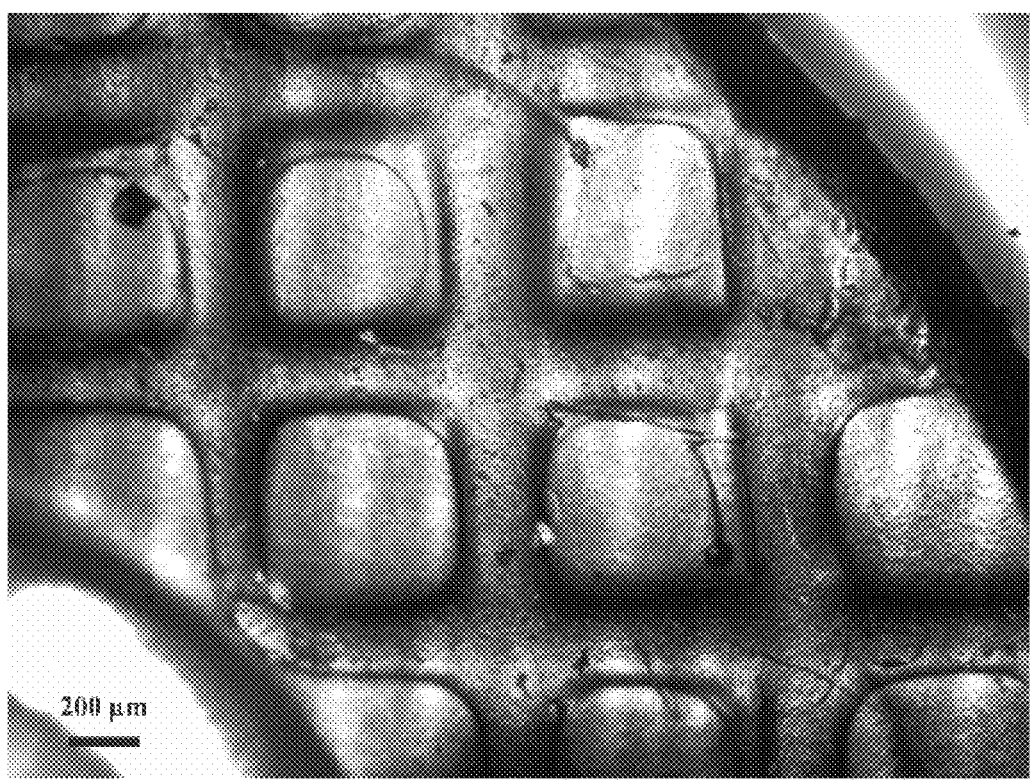
Figure 5C:
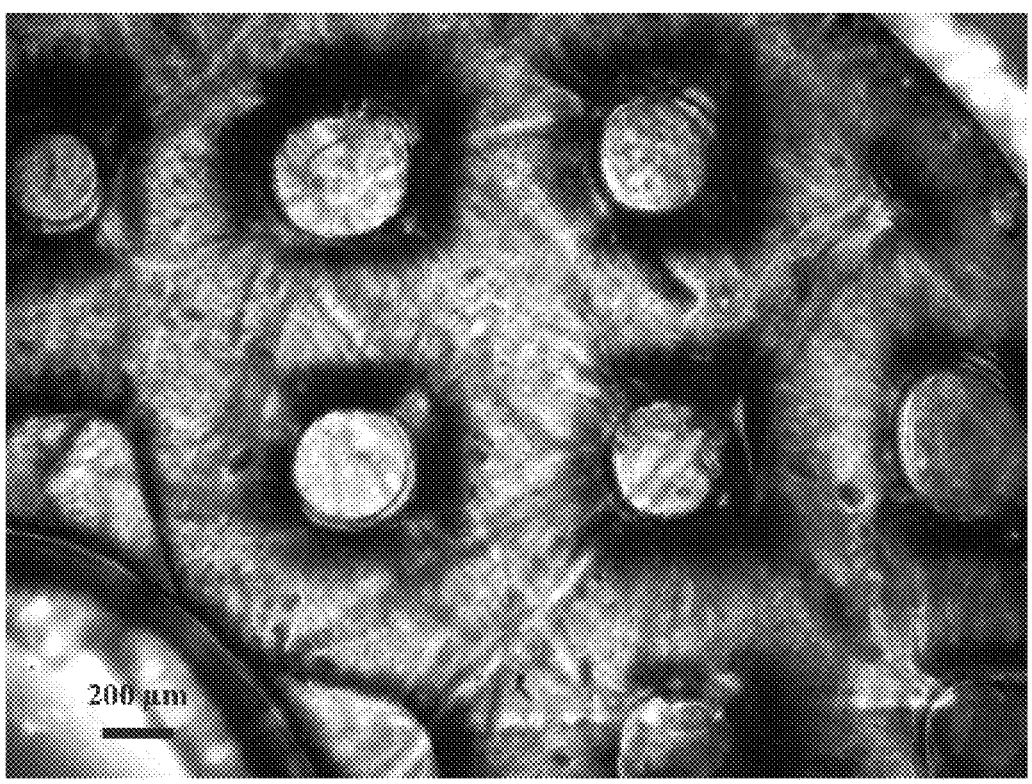
Figure 6:
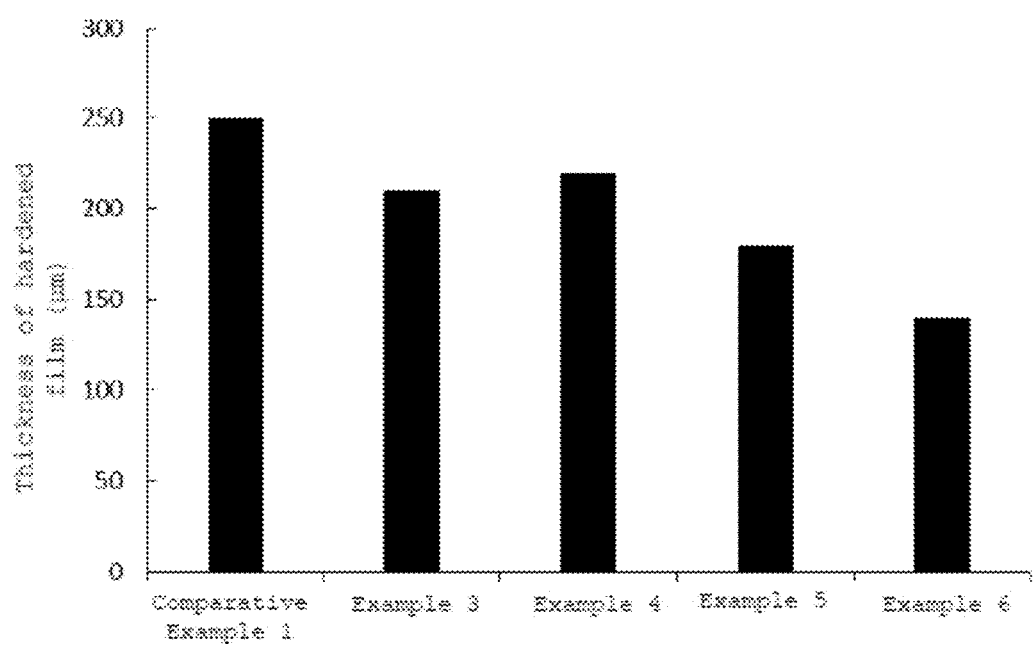
FIG. 6 shows a graph comparing the thickness of hardened films in a test of anti-adhesion effect in Comparative Example 1, and Examples 3 to 6.

Then, the substrate M2 was subjected to the optimal exposure time test at an exposure time of 5 sec, 6 sec, and 7 sec. The 3D fine structures formed at an exposure time of 5 sec, 6 sec, and 7 sec were sequentially shown in FIG. 5A to FIG. 5C, and observed with microscope, showing that the best forming effect is achieved at the exposure time of 6 sec. Therefore, the optimal exposure time of the substrate M2 is 6 sec.

Then, a separating force test was performed using the substrate M2 at the optimal exposure time of 6 sec for 8 times in total, and the resulting separating forces were 11.47 N, 14.36 N, 13.14 N, 10.71 N, 12.08 N, 10.62N, 9.84N, and 11.24 N respectively. An average separating force was calculated to be 11.90 N and the value was recorded in Table 1.

TABLE 1

| | | Comparative Example 1 | Example 1 | Example 2 |
|---|---|---|---|---|
| Substrate | | T1 | M1 | M2 |
| Mold release composition | | — | S1 | S2 |
| Molding agent | PDMS (wt %) | — | 47.5 | 45 |
| | PDMS hardening agent (wt %) | — | 47.5 | 45 |
| Radical scavenger | Vitamin E (wt %) | — | 5 | 10 |
| Optimal exposure time (sec) | | 3 | 4 | 6 |
| Average separating force (N) | | 23.36 | 14.44 | 11.90 |

It can be seen from Table 1 above, when the substrates M1 and M2 containing a radical scavenger are used, the separating forces of the hardened film to the substrate both are significantly lower than that of the untreated substrate, where the separating force of the substrate M1 is 61.81% of that of the substrate T1 and the separating force of the substrate M2 is 50.94% of that of the substrate T1, indicating that when a substrate material containing a radical scavenger is used to carry a photocurable material for a light curing reaction, a separating force in a forming process of the photocurable material can be effectively reduced. In addition, the separating force of the substrate M2 is 82.41% of that of the substrate M1, indicating that when a substrate material contains a radical scavenger, the higher content of the radical scavenger can more effectively reduce a separating force in a forming process of the photocurable material.

Examples 3 to 6

First, PDMS, PDMS hardening agent (a silane compound having multiple functional groups), vitamin E, BHT, MEHQ, and 10-TF were uniformly mixed in the dosages shown in Table 2 to obtain a mold release composition S3, a mold release composition S4, a mold release composition S5, and a mold release composition S6; and then, hexane as diluent was uniformly mixed with the mold release compositions S3 to S6 respectively, where the weight ratio of hexane to each mold release composition is 1:2. Then, the mold release compositions S3 to S6 were respectively coated on a substrate surface having vinyl functional groups. Herein, vitamin E is a vitamin E antioxidant, and BHT, MEHQ, and 10-TF are hindered phenol antioxidants.

Then, they were heated at 60° C. for 24 h, such that the mold release compositions S3 to S6 were subjected to grafting, bonding or crosslinking reaction with vinyl groups in the plate, to be fixed to the plate surface, forming a substrate M3, a substrate M4, a substrate M5, and a substrate M6.

Then, the substrate M3, the substrate M4, the substrate M5, and the substrate M6 were subjected to the anti-adhesion effect test, respectively. The thicknesses of hardened films obtained via alight curing reaction were measured to be 210 μm, 220 μm, 180 μm, and 140 μm sequentially, and the values were recorded in Table 2.

TABLE 2

| | | Comparative Example 1 | Example 3 | Example 4 | Example 5 | Example 6 |
|---|---|---|---|---|---|---|
| Substrate | | T1 | M3 | M4 | M5 | M6 |
| Mold release composition | | — | S3 | S4 | S5 | S6 |
| Molding agent | PDMS (wt %) | — | 47.5 | 47.5 | 47.5 | 47.5 |
| | PDMS hardening agent (wt %) | — | 47.5 | 47.5 | 47.5 | 47.5 |
| Radical scavenger | Vitamin E (wt %) | — | 5 | 0 | 0 | 0 |
| | BHT (wt %) | — | 0 | 5 | 0 | 0 |
| | MEHQ (wt %) | — | 0 | 0 | 5 | 0 |
| | 10-TF (wt %) | — | 0 | 0 | 0 | 5 |
| Thickness of hardened film (μm) | | 250 | 210 | 220 | 180 | 140 |

FIG. 5 shows a graph comparing the thickness of hardened films in Comparative Example 1, and Examples 3 to 6. It can be seen from the results in Table 2 and FIG. 5 that the thicknesses of the hardened films formed by a light curing reaction using the substrate M3, the substrate M4, the substrate M5, and the substrate M6 to carry a photocurable material all are thinner than that of the the untreated substrate T1, indicating that the anti-adhesion effect of the substrates M3 to M6 all is better than that of the substrate T1. The substrates M3 to M6 contain different radical scavengers, indicating that different radical scavengers all have the effect of improving the anti-adhesion effect of the substrates, where the hardened film formed using the substrate M6 containing 10-TF is the thinnest, achieving the best anti-adhesion effect. However, the radical scavenger used in the present invention is not limited thereto, and it should be appreciated by those ordinarily skilled in the art that any compound that is reactive with free radicals can be used as a radical scavenger and applied in the present invention.

Example 7

First, a photocurable material and vitamin C were uniformly mixed in a weight ratio of 95:5 to prepare a photocurable material containing 5.0 wt % of vitamin C; and then, a region A and a region B were respectively disposed on a surface of the substrate M1 prepared in Example 1, where the region A and the region B were squares having a side-length of 1 cm.

2.0 mL of the photocurable material containing no vitamin C was dropped in the region A with a pipette, and 2.0 mL of the photocurable material containing 5.0 wt % of vitamin C was dropped in the region B with a pipette. Then, a light curing reaction was performed at a light intensity of 40 mW/cm$^2$ and an exposure time of 4 sec. The anti-adhesion effect of the substrate was evaluated by observing the conformation condition of the resulting hardened films to the substrate M1 in the region A and the region B, and the evaluation results were recorded.

The criteria for determination on anti-adhesion effect are described as follows:

When a hardened film does not conform to a substrate at all and can be easily separated from the substrate surface, the reactivity is evaluated as good (O); when a partial surface of a hardened film conforms to a substrate and can be separated from the substrate surface by a slight force, the reactivity is evaluated as fair (Δ); and when the surface of a hardened film completely conforms to a substrate and can be removed from the substrate surface by a force, resulting in damages to the surface of the hardened film, the reactivity is evaluated as poor (X).

After the observation was completed, the photocurable material remaining on the surface of the substrate M1 was removed, and the above light curing reaction was repeated. The conformation condition of the resulting hardened films to the substrate M1 in the region A and the region B after increasing the reaction number was observed for 1000 reactions in total, and the reactivity evaluation results every 100 reactions were shown in Table 3.

TABLE 3

| | Substrate source | |
|---|---|---|
| | Substrate M1 | Substrate M1 |
| Tested region | Region A | Region B |
| Photocurable material with or without sustaining agent (5% vitamin C) | No | Yes |
| Reaction number 100 | ○ | ○ |
| 200 | ○ | ○ |
| 300 | ○ | ○ |
| 400 | ○ | ○ |
| 500 | ○ | ○ |
| 600 | ○ | ○ |
| 700 | ○ | ○ |
| 800 | ○ | ○ |
| 865 | Δ | ○ |
| 900 | Δ | ○ |
| 1000 | Δ | ○ |

It can be seen from Table 3 that when the region A in the substrate M1 carries the photocurable material containing no vitamin C for the light curing reaction, before 865 reactions, the hardened films all can be easily separated from the substrate M1, and the uncured photocurable material can be observed on the surface of the region A after the separation, indicating that during the light curing reaction, the photocurable material is subjected to the effect of the radical scavenger in the substrate M1, an uncured inhibiting layer is formed between the hardened film and the substrate M1; and until the $865^{th}$ reaction, some adhesion between the hardened film and the substrate M1 starts to be observed, showing that the reaction of the radical scavenger in the region A and the free radicals in the photocurable material possibly has gradually become saturated, and the reactivity starts to decrease.

In contrast, when the region B in the substrate M1 carries the light curing resin containing 5.0 wt % of vitamin C for the light curing reaction, until the $1000^{th}$ reaction, the hardened film still can be easily separated from the substrate M1, and the uncured photocurable material can be observed on the surface of the region B after the separation, indicating that during the light curing reaction, in addition to the effect of the radical scavenger in the substrate M1 on the photocurable material, vitamin C in the photocurable material can also reduce the radical scavenger that has reacted with the free radicals, thereby achieving the cycle of the reaction, maintaining the stability of the uncured layer, and prolonging the lifetime of the substrate.

It can be seen from this that according to the present invention, by adding a radical scavenger in a substrate or creating a mold release film containing a radical scavenger, during the process of a light curing reaction, free radicals generated by a photocurable material due to exposure can react with the radical scavenger in the substrate material, such that an uncured layer for which curing cannot occur is formed between the substrate and the photocurable material, thereby solving the problem of adhesion of the photocurable material to the substrate during the curing. In addition, a sustaining agent may be further added in the photocurable material or the radical scavenger that has reacted with the free radicals is reduced in an electrochemical manner, thus achieving a continuous printing process where the substrate surface is not cured, and overcoming the limitation in printing speed of the current stereolithography technology.

To sum up, the content of the present invention has been specifically described by means of examples in the above embodiments; however, the present invention is not limited to these embodiments. It should be appreciated by those ordinarily skilled in the art that various variations and modifications can be made without departing from the spirit and scope of the invention; for example, all technical contents illustrated in the above embodiments may be combined or changed into a new embodiment, and such embodiments are intended to fall within the scope of the invention. Thus, the scope of the application includes the scope defined in the appended claims.

REFERENCE NUMBERS

S1, S2 Step

What is claimed is:

1. A method for reducing a drawing force in a forming process of a photocurable material, the method comprising the following steps:
   providing a mold release composition at least comprising a radical scavenger and a molding agent, wherein the radical scavenger is configured for terminating free radical polymerization by inhibiting carbon free radicals, or OH, RO, ROO, or other components containing oxygen free radicals released during the forming process of the photocurable material, and wherein the molding agent consists of silicon dioxide and/or a polymeric material that is light-transmittable after curing;
   forming a mold release film from the mold release composition by curing forming or by combining with an upper surface of a plate, thereby preparing a substrate;
   placing the photocurable material on the substrate;
   irradiating the photocurable material using a light source to cure a portion of the photocurable material, wherein the photocurable material releases the free radicals during the irradiating step, and wherein the free radicals react with the radical scavenger in the upper surface of the substrate and form an uncured layer on the upper surface of the substrate to avoid adhesion of the cured portion of the photocurable material to the substrate; and
   reducing the reacted radical scavenger in the upper surface of substrate by:
      i. adding a sustaining agent into the photocurable material, wherein the sustaining agent is configured to reduce the radical scavenger that has reacted with the free radicals; or
      ii. applying a voltage to the substrate, wherein voltage is configured to reduce the radical scavenger that has reacted with the free radicals using the principle of electrochemical reaction.

2. The method for reducing a drawing force in a forming process of a photocurable material according to claim 1, wherein the mold release composition comprises 1 to 20 wt. % of the radical scavenger and 80 to 99 wt. % of the molding agent.

3. The method for reducing a drawing force in a forming process of a photocurable material according to claim 1, wherein the radical scavenger is a vitamin antioxidant consisting of a water-soluble vitamin and/or a fat-soluble vitamin; the fat-soluble vitamin is at least one selected from the group consisting of vitamin A, vitamin D, vitamin E, and vitamin K, and the water-soluble vitamin is at least one selected from the group consisting of vitamin B1, vitamin B2, vitamin B3, vitamin B5, vitamin B6, vitamin B7, vitamin B9, vitamin B12, and vitamin C.

4. The method for reducing a drawing force in a forming process of a photocurable material according to claim 1, wherein the radical scavenger is a phenolic antioxidant, which is a hindered phenol antioxidant, a semi-hindered phenol antioxidant, a polymeric hindered phenol antioxidant, or a reactive hindered phenol antioxidant.

5. The method for reducing a drawing force in a forming process of a photocurable material according to claim 1, wherein the radical scavenger is a C-centered radical scavenger, which is selected from the group consisting of hindered amines, benzofuranones, hydroxylamines, tertiary amine oxides, or bisphenol monoacrylates.

6. The method for reducing a drawing force in a forming process of a photocurable material according to claim 1, wherein the radical scavenger is a natural antioxidant, which is at least one polyphenol antioxidant selected from the group consisting of flavonoids, flavonol, flavone, catechin, flavanone, anthocyanin, soflavonoid, and extracts from natural plants; wherein the natural plants include at least one of Milk Thistle, Soybean, Wine grape, Acai berry, coffee berry, chamomile, pomegranate, ferns, and turmeric.

* * * * *